United States Patent
Van Overveld

[19]

[11] Patent Number: 6,049,337

[45] Date of Patent: Apr. 11, 2000

[54] METHOD AND APPARATUS FOR ADJUSTING RELATIVE OFFSETS BETWEEN TEXTURE MAPS DEPENDENT UPON VIEWPOINT

[75] Inventor: Cornelis W. A. M. Van Overveld, Eindhoven, Netherlands

[73] Assignee: U. S. Philips Corporation, New York, N.Y.

[21] Appl. No.: 08/972,977

[22] Filed: Nov. 19, 1997

[30] Foreign Application Priority Data

Nov. 21, 1996 [EP] European Pat. Off. .............. 96203265

[51] Int. Cl.[7] ................................................. G06T 11/40
[52] U.S. Cl. ............................................................ 345/430
[58] Field of Search ...................... 345/425, 430, 345/473

[56] References Cited

U.S. PATENT DOCUMENTS 5,446,833  8/1995  Miller et al. ............................ 345/425
5,680,531  10/1997  Litwinowicz et al. .................. 345/473
5,760,783  6/1998  Migdal et al. ........................... 345/430

FOREIGN PATENT DOCUMENTS

0583061A2  2/1924  European Pat. Off. ........ G06F 15/72
0707288A2  4/1996  European Pat. Off. ........ G06T 15/10

*Primary Examiner*—Mark K. Zimmerman
*Attorney, Agent, or Firm*—Gregory L. Thorne

[57] ABSTRACT

Parallactic changes in the appearance of a surface are simulated using texture mapping. When an image is computed, more than one texture is mapped to the same surface. The coordinate maps of those textures are shifted relative to each other when the viewpoint from which the surface is viewed changes. One texture is normally shown on a pixel the surface, unless indicates a "transparent" state for that pixel, in which case the other texture is shown.

8 Claims, 2 Drawing Sheets

METHOD AND APPARATUS FOR ADJUSTING RELATIVE OFFSETS BETWEEN TEXTURE MAPS DEPENDENT UPON VIEWPOINT

BACKGROUND OF THE INVENTION

1. Field of the Invention

The invention relates to a method of generating a two dimensional image of a surface in a higher dimensional model space, the method comprising the steps of selecting a viewpoint relative to the surface;

determining an area in the image in which the surface is visible as viewed from the viewpoint;

texture mapping a texture on said area, according to a coordinate map.

The invention also relates to a computer graphics device comprising a mapping unit, for mapping a modeled surface from a three or higher dimensional space on an area of pixels in a two dimensional image and a texture mapping unit for mapping a texture on the pixels of said area, according to a coordinate map.

2. Description of the Related Art

Such a method is known for example from GB patent application no GB 2,288,304.

In computer graphics a two dimensional visual image is generated of mathematically modeled surfaces in a higher dimensional space, as viewed from a selectable viewpoint in that higher dimensional space. To enhance the realism of the image, texture mapping is applied to the surfaces. The model of a surface specifies a texture and a correspondence between surface locations and texture coordinates (u,v). From this correspondence follows a coordinate map which maps pixel coordinates (x,y) of pixels in an area in the image where the surface is visible, to texture coordinates (u,v). A pixel in such an area with pixel coordinate pair (x,y) is rendered in the image according to the visual property assigned by the texture to the texture coordinate pair (u,v) to which that pixel coordinate pair (x,y) maps.

Texture mapping provides good results for representing optical texture such as coloring. Texture mapping works less well for representing geometrical texture, such as the texture associated with unevenness of the surface (bumpiness), because the appearance of such a texture depends on the direction from which it is viewed, and not merely on the position of pixels on the surface. This means that texture mapping lacks realism when images, of the same surfaces from different viewpoints, have to be computed of surfaces that look differently from different angles, for example for simulating movement through the higher dimensional space or for simulating stereoscopic image pairs.

In order to enhance the realism of the images in such circumstances, a method of texture mapping must be provided which makes it possible to change the appearance of the mapped texture as a function of the direction from which the surface is viewed.

It has been known to achieve this by supplementing the texture by a surface normal perturbation function, as a function of the texture coordinates. In the calculation of the image contribution of a pixel with a certain pixel coordinate pair (x,y) in an area in which the surface is visible, a perturbed normal is calculated by perturbing the normal of the surface according to the perturbation function value for the texture coordinate pair (u,v), to which the pixel coordinate pair (x,y) maps. The parameters of the light reaching the viewpoint via the surface are subsequently computed according to the perturbed surface normal. This makes it possible to represent lighting changes due to unevenness of the surface, but it does not make it possible to represent parallax changes. Moreover, the calculation of perturbed surface normals is a resource intensive operation.

SUMMARY OF THE INVENTION

Amongst others, it is an object of the invention to provide for a computer graphics method and device, in which parallax effects in texture can be generated with little overhead.

The method according to the invention is characterized, in that it comprises texture mapping at least a further texture on said area according to a further coordinate map, a relative offset between the coordinate map and the further coordinate map being adjusted in dependence on the viewpoint;

rendering a combination of said mapped texture and said further mapped texture in said area. Thus, at least two textures maps are used for the same surface, each involving its own texture assigning a visual property as a function of texture coordinates pair (u,v). Each texture map also defines its own coordinate map, which maps coordinate pairs (x,y) of pixels in the area where the surface is visible to texture coordinate pairs (u,v). The coordinate maps defined by the different texture maps each depend in a different way on the direction from which the surface is viewed, so as to simulate the effect of different spacings between the surface and notional surfaces carrying the corresponding textures. For a pixel which belongs to the area in which the surface is visible, a respective visual property is determined by conventional texture mapping for each of the texture maps used for the surface. The pixel is rendered in the image according to a combination of these visual properties. The required calculations are largely the same as those needed for conventional texture mapping. Thus, it is possible to render parallax changes of a texture better than conventional texture mapping without more complex calculations.

In an embodiment of the method according to the invention, said relative offset is in a direction of a normal projection on said surface of a line of sight from the viewpoint to the surface, and said relative offset has a magnitude which is a function of an angle between said line of sight and a normal to the surface. The magnitude may, for example, be proportional to the tangent function $tg(\theta)$ of the angle $\theta$ between the normal and the line of sight, so as to model a spacing between two notional versions of the surface carrying the respective textures. Alternatively, the dependence of the magnitude on $\theta$ may simulate the effect of a layer with a refractive index different from the surroundings between the two notional versions of the surface.

In a further embodiment, said first texture only is rendered at a pixel in the image, when a value of said texture indicates an untransparent state at said pixel, and wherein, said further texture is used for determining said pixel, when the value of said texture indicates a transparent state. Thus, a first one of the textures assigns transparency state as a function of texture coordinates (u,v). The pixel with pixel coordinates (x,y) is rendered according to the first one of the textures when the transparency state "not-transparent" is assigned to the respective texture coordinate pairs (u,v), to which those pixel coordinates (x,y) map, and the pixel is rendered according to a second one of the textures when a transparency state "transparent" is assigned to the respective texture coordinate pairs (u,v), to which those pixel coordinates (x,y) map.

Preferably, the texture that determines the transparency is the texture that appears to be topmost from parallax effects. This appearance depends the adjustment of the offset: if, in response to a change in viewpoint, one coordinate map shifts relatively more than another coordinate map in a direction opposite to the change in viewpoint (or less in a direction of the change in viewpoint), parallax effects will make the associated texture of the one coordinate map appear to lie below the texture associated with the other coordinate map.

BRIEF DESCRIPTION OF THE DRAWINGS

These and other advantageous aspects of the invention will be described in more detail using the following figures, in which.

DETAILED DESCRIPTION OF THE PREFERRED EMBODIMENTS

Figure 1:
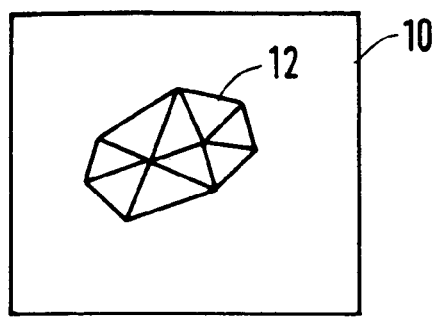
FIG. 1 shows a two-dimensional image of a higher dimensional scene.

FIG. 1 shows a two-dimensional image 10 of a scene in a higher dimensional space. In a computer graphics device, such an image 10 is generated from a scene model, which provides a mathematical representation of surfaces in the higher dimensional space. From the scene model it is computed which surfaces are visible in the image 10, and where they are visible. A surface may be a triangle, which can be mathematically represented by the coordinates of it corner points, such a triangular surface is visible as a triangular area in the image 10 (in case it is entirely visible). By way of example, the image 10 in FIG. 1 contains an object represented by a number of triangular areas (e.g. 12) which represent surfaces from the scene model.

To enhance the realism of the image, the computer graphics device may display texture patterns in the areas shown in the image 10. This is realized by means of texture mapping.

Figure 2:
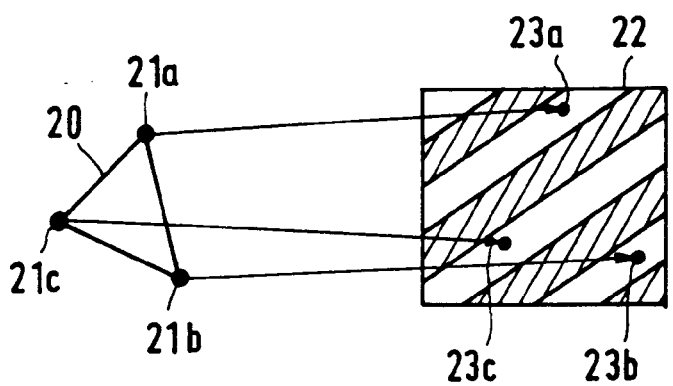
FIG. 2 illustrates the parameters involved in texture mapping.

FIG. 2 shows the parameters involved in texture mapping. FIG. 2 shows a triangle 20 as an example of a representation of a surface from the higher dimensional space. The figure also shows an intensity pattern of diagonal stripes as a function of texture coordinate. This intensity pattern is an example of a texture. Furthermore, the figure shows correspondences between the corners 21a–c of the triangle and texture coordinate points 23a–c. These correspondences represent information in the scene model that the surface 20 carries an intensity pattern according to the specified texture 22, and that at the corners 21a–c of the triangle 20 the intensity values are those of the corresponding coordinate points 23a–c in the texture. The intermediate texture coordinate points of other points on the surface follow from (bi-)linear interpolation of the texture coordinate points 23a–c of the corners 21a–c, and from the intensity values assigned by the texture to those intermediate texture coordinate points follows the intensity distribution of the surface.

The computer graphics device implements the texture mapping process by computing a coordinate map which maps pixel coordinate pairs (x,y) in the image 10 to texture coordinate pairs (u,v). For the example of FIG. 2, this coordinate map follows from the way points on the surface 20 are projected onto the image 10 and from the correspondences between the corner points 21a–c and texture coordinate points 23a–c. For each pixel in an area in the image 10 where a surface 12 is visible, the computer graphics device computes the corresponding texture coordinate pair (u,v), and obtains the value of the texture for that texture coordinate pair (u,v). This value is then used to determine the visual properties of the pixel.

Texture mapping works well for representing optical properties of surfaces, such as location dependent color et cetera. Texture mapping works less well for coefficients et cetera. Texture mapping works less well for representing geometrical texture.

Figure 3:
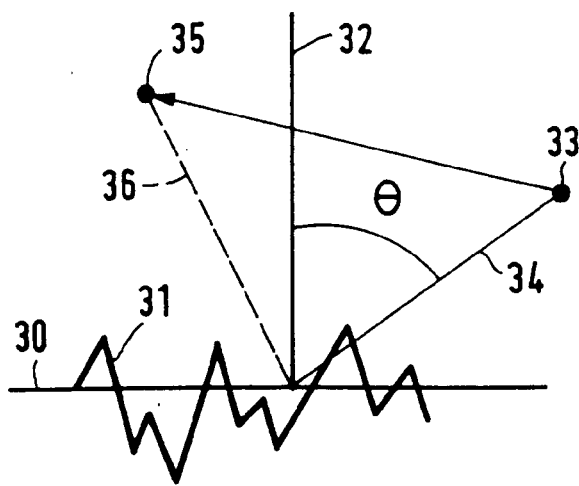
FIG. 3 shows a side view of a surface.

FIG. 3 shows a side view of a surface, to illustrate the properties of a geometrical texture. The figure shows a viewpoint 33 and a line of view 34 from which a notional surface is viewed. This notional surface is shown by a jagged line 31, which represents that the height profile of the notional surface varies non-linearly (in the illustration piecewise linearly) along the surface. In the scene model, the notional surface 31 is modeled by a flat surface, shown in FIG. 3 by a straight line 30, and a texture mapping which is used in the two dimensional image 10 to fill-in the visual effect of the profile and other properties of the surface, such as variations in absorption or reflection.

Ideally, texture mapping should account for the change of appearance of the surface when the viewpoint 33 changes. To illustrate this change of appearance, FIG. 3 shows a further viewpoint 35 and a further line of view 36 from that viewpoint. It will be seen that from the further viewpoint parts of the surface 31 are visible that are invisible from the original viewpoint 33 and vice versa. These parts may have optical properties that differ from those of the parts that are visible from the original viewpoint 33. The resulting change of appearance of the surface is called a parallax change. Furthermore, it will be seen that the angle of incidence of the line of view 34, 36 from the viewpoint 33, 35 to the parts of the surface 31 changes when the viewpoint 33, 35 changes. This results in a change in the appearance of the surface observed from the viewpoint 33, 35. The resulting change in appearance is called a lighting change.

Figure 4:
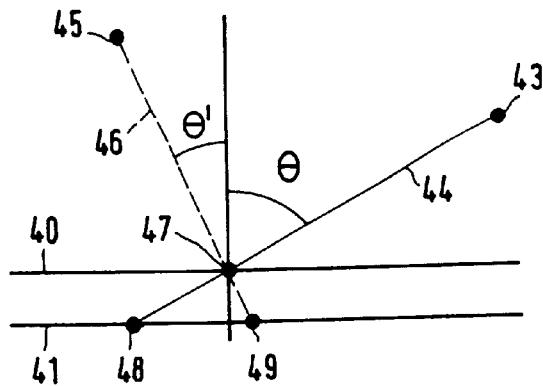
FIG. 4 shows a further side view.

FIG. 4 shows a further side view of a surface, to illustrate a method of accounting for parallax changes due to changes in viewpoint in a simple way. This method conceptually uses two auxiliary surfaces that both run in parallel to the actual surface with a spacing between the auxiliary surfaces. For each of the auxiliary surfaces a texture map is defined, for example one texture map by making a texture map of the part of the notional surface 31 of FIG. 3 that extends above the flat surface 30 (the texture being marked transparent where the notional surface 31 is below the flat surface 30), and another texture map of the part of the notional surface 31 that lies below the flat surface 30. The distance between the auxiliary surfaces is taken for example as the difference between the average heights of the two parts of the notional surface that lie above and below the flat surface 31 respectively. In order to fill in the texture in the area 12 in the image 10 where the surface is visible, for each pixel in that area a texture value is determined for both the auxiliary surfaces. The resulting texture values are combined to obtain the actual image contribution of the pixel.

FIG. 4 shows two viewpoints 43, 45 and two corresponding lines of view 44, 46. In side view, two straight lines 40, 41 represent two auxiliary surfaces that run in parallel to each other. A texture coordinate pair (u,v) is defined for each point of each auxiliary surface 40, 41. The lines of view 44, 46 from the two viewpoints 43, 45 intersect a first auxiliary surface 40 in a single point 47. These lines of view 44, 46 intersect a second auxiliary surface 41 in two different points 48, 49. It will be seen that a first point 47 on the first auxiliary surface 40 that lies on one line of view 44 with a second point 48 on the second auxiliary surface 41 from one viewpoint 43, lies on one line of view with a third point 49 on the second auxiliary surface 41 from the other viewpoint 45. A pixel coordinate pair (x,y) that is mapped to the texture coordinate pair (u,v) of the first point on the first auxiliary surface is therefore mapped either to a second or third texture coordinate pair of points on the second auxiliary surface 41, depending on the viewpoint 43, 45. When respective textures are associated with the two auxiliary surfaces 40, 41, and the texture values to which a pixel maps are combined to fill-in the image, e.g. by using either a first texture or a second texture, depending on a transparency state of the first texture, this results in a change of appearance of the image, depending on the viewpoint. This change of appearance simulates parallax changes. More than two textures may be used to simulate more complex parallax changes,; in this case, each texture is, for example, associated with a different auxiliary surface in a stack of auxiliary surfaces. The texture value associated with a particular auxiliary surface is then used for a pixel, if all textures associated with auxiliary surface that lie above that particularly auxiliary surface map a "transparent" state to that pixel.

For the actual calculation of the image, it is not necessary to construct the auxiliary surfaces, but the difference between the maps may be determined from the incidence vector of the line of view from the viewpoint to the mapped location on the surface. This vector is defined by an angle $\theta$ between the line of view 44 and the normal to the surface, and a direction z of the normal projection of the line of view 44 on the surface relative to the uv-coordinate axes of the texture coordinate system on the surface (the normal projection of a point on a surface is the surface point obtained by shifting the point in parallel with the normal). The offset between the texture maps has a magnitude dependent on ((preferably proportional to $tg(\theta)$ and the displacement between the auxiliary surfaces) and a direction relative to the texture coordinate axes dependent on the direction z of the normal projection.

Other dependencies on $\theta$ may also be used. For example, one may simulate a refractive layer between the auxiliary surfaces, such as glass, that has a refractive index "na" that differs from the refractive index "nb" of the medium between the viewpoint and the surface. In this case, the difference between the coordinate maps follows from Snellius's Law (offset proportional to $\sin \theta/\sqrt{(na/nb)^2 - \sin^2\theta}$). The dependence on $\theta$ may also involve a dependence on location on the surface, for example to model a "bumpy" auxiliary surface, with a proportionality factor for the offset defined for each texture coordinate.

In many cases, especially when the area to which the surface maps is small, the difference between the coordinate maps for the two auxiliary surfaces may be approximated by a pixel independent shift, which can be calculated once for the entire surface from the incidence vector of the line of view from the viewpoint on the surface.

Instead of a three dimensional model space, a higher dimensional model space may be used, for example a time dependent three dimensional space in which the parallax effects of a surface change as a function of time, for example in a surface representing waving grass. In this case, the offset between the coordinate maps may also be adjusted as a function of the time coordinate of the viewpoint.

Figure 5:
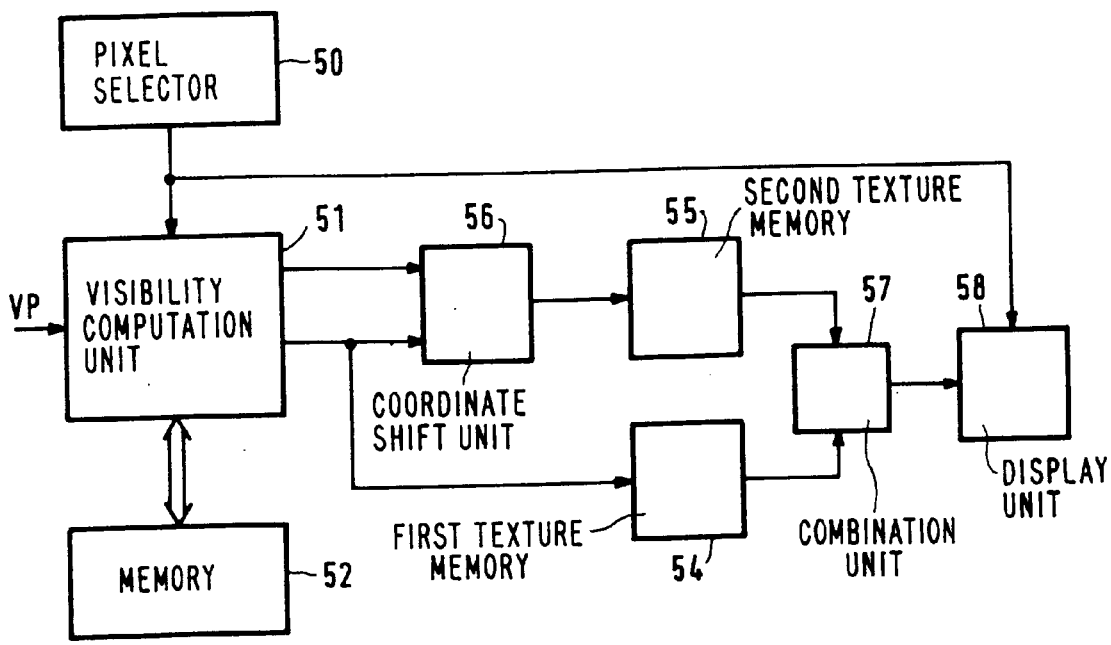
FIG. 5 shows a device for generating two-dimensional images.

FIG. 5 shows a conceptualized computer graphics device for implementing the invention. This device contains a memory 52 for storing a scene model, coupled to a visibility computation unit 51. A pixel selector 50 is also coupled to the visibility computation unit 51. An output of the visibility computation unit 51 is coupled to a first texture memory 54 and via a coordinate shift unit 56 to a second texture memory 55. The outputs of the first and second texture memories 54, 55 are coupled to a combination unit 57, which has an output coupled to a display unit 58.

In operation, the visibility computation unit 51 receives a specification of a viewpoint VP, and computes which of the surfaces defined in a scene model stored in the memory 52 are visible from that viewpoint in an image to be generated. The visibility computation unit 51 also determines where in the image each surface is visible. The pixel selector 50 selects successive pixels and transmits their pixel coordinate pairs (x,y) to the visibility computation unit 51. Thereupon the visibility computation unit 51 determines which surface is visible at the pixel and the visibility computation unit 51 signals the texture to be used and a texture coordinate pair (u,v) to which the pixel coordinate pair is mapped. This texture coordinate pair (u,v) is used as an address to the first texture memory 54. In the coordinate shift unit 56, a coordinate shift signaled by the visibility computation unit for the surface is added to the texture coordinates (u,v). The resulting shifted texture coordinates (u',v') are used to address the second texture memory 55. The texture values thus addressed in the texture memories 54, 55 are combined in the combination unit 57 and visually displayed at the pixel coordinates (x,y) by the display unit 58.

The visibility computation unit 51 computes the coordinate shift once for every surface for a given viewpoint, or, if desired, as a function of location on the surface. The combination unit 57 may combine the texture values in various ways. In a preferred way one of the texture memories 54, 55 indicates a "transparency state" of the texture value. Preferably the texture used to indicate the transparency state is the texture that appears "parallactically topmost", i.e relative to which the offset of the other textures shift in the opposite direction to the direction of movement of the viewpoint, when the viewpoint is changed. When transparency is indicated, the texture value from the other texture memory 54, 55 is used. Otherwise the one texture memory 54, 55 issues its own texture value and only that value is used. Of course one may also add texture values in the combination unit or use alpha channeling to simulate partial transparency of one texture et cetera.

For more complex parallax effects any number of additional texture memories may be used, each receiving its address from the visibility computation unit via its own coordinate shift unit for adding to the texture coordinate (u,v) a coordinate shift signaled by the visibility computation unit 51 for that texture memory. In this case, the combination unit 57 combines the textures from each of the texture memories.

In practice, the texture values may be calculated sequentially instead of in parallel, using different textures from the same texture memory. The pixel selector 50, the visibility computation unit 51, the combination unit 57 and the coordinate shift unit 56 may be combined in a suitably programmed computer, the texture memory or memories 54, 55 and the memory 52 may be combined. The texture memory or memories will normally be "mipmap" memories that store the texture in different resolutions, the computer graphics device selecting an appropriate resolution. In practice also the computer graphics device may use the texture values obtained or their combination for some postprocessing, for example to account for lighting conditions if the texture provides absorption or reflection parameters of the surface.

I claim:

1. A method of generating a two dimensional image of a surface in a higher dimensional model space, the method comprising the steps of selecting a viewpoint relative to the surface;

determining an area in the image in which the surface is visible as viewed from the viewpoint;

texture mapping a texture on said area, according to a coordinate map, characterized, in that the method comprises texture mapping at least a further texture on said area according to a further coordinate map, a relative offset between the coordinate map and the further coordinate map being adjusted in dependence on the viewpoint;

rendering a combination of said mapped texture and said further mapped texture in said area.

2. A method according to claim 1, wherein said relative offset is in a direction of a normal projection on said surface of a line of sight from the viewpoint to the surface, and said relative offset has a magnitude which is a function of an angle between said line of sight and a normal to the surface.

3. A method according to claim 2, wherein said first texture only is rendered at a pixel in the image when a value of said texture indicates an untransparent state at said pixel and wherein said further texture is used for determining said pixel when the value of said texture indicates a transparent state.

4. A method according to claim 1, wherein said first texture only is rendered at a pixel in the image when a value of said texture indicates an untransparent state at said pixel and wherein said further texture is used for determining said pixel when the value of said texture indicates a transparent state.

5. A computer graphics device comprising a mapping unit, for mapping a modeled surface from a three or higher dimensional space on an area of pixels in a two dimensional image and a texture mapping unit for mapping a texture on the pixels of said area, according to a coordinate map, characterized, in that the texture mapping unit is arranged for mapping at least a further texture on the pixels of said area according to a further coordinate map, the texture mapping unit adjusting a relative offset between the coordinate map and the further coordinate map being in dependence on the viewpoint on the surface; the computer graphics device comprising a combining unit for forming a combination of texture values from said texture map and said further texture map for mapping on the pixels of said area.

6. A computer graphics device according to claim 5, wherein the texture mapping unit adjusts said relative offset in a direction of a normal projection on said surface of a line of sight from the viewpoint to the surface, the relative offset having a magnitude which is a function of an angle between said line of sight and a normal to the surface.

7. A computer graphics device according to claim 6, wherein said first texture only is rendered at a pixel in the image when a value of said texture indicates an untransparent state at said pixel and wherein said further texture is used for determining said pixel when the value of said texture indicates a transparent state.

8. A computer graphics device according to claim 5, wherein said first texture only is rendered at a pixel in the image when a value of said texture indicates an untransparent state at said pixel and wherein said further texture is used for determining said pixel when the value of said texture indicates a transparent state.

* * * * *